United States Patent [19]

Wesch et al.

[11] 4,292,364

[45] Sep. 29, 1981

[54] MULTI-LAYER BOARD

[75] Inventors: Ludwig Wesch, Heibelberg; Adolf Meyer, Leimen-Lingental, both of Fed. Rep. of Germany

[73] Assignee: Heidelberger Zement Aktiengesellschaft, Heidelberg, Fed. Rep. of Germany

[21] Appl. No.: 95,780

[22] Filed: Nov. 19, 1979

Related U.S. Application Data

[63] Continuation of Ser. No. 893,257, Apr. 5, 1978, abandoned.

[30] Foreign Application Priority Data

| | | |
|---|---|---|
| Apr. 27, 1977 [DE] | Fed. Rep. of Germany | 2718626 |
| Apr. 13, 1978 [AT] | Austria | 2581/78 |
| Apr. 14, 1978 [CH] | Switzerland | 4014/78 |
| Apr. 22, 1978 [ES] | Spain | 469063 |
| Apr. 22, 1978 [GB] | United Kingdom | 10751/78 |
| Apr. 24, 1978 [JP] | Japan | 53-49189 |
| Apr. 26, 1978 [FR] | France | 78 2321 |
| Oct. 26, 1978 [NL] | Netherlands | 7810667 |
| Oct. 31, 1978 [CA] | Canada | 315251 |

[51] Int. Cl.³ .................. B32B 13/12; B32B 13/14
[52] U.S. Cl. .................. 428/286; 52/309.17; 156/327; 428/284; 428/292; 428/294; 428/414; 428/454; 428/688; 428/703
[58] Field of Search .............. 428/70, 310, 310 HC, 428/315, 538, 317, 320; 52/309.17, 309.1, 630; 156/325, 327, 330

[56] References Cited

U.S. PATENT DOCUMENTS

| | | | |
|---|---|---|---|
| 2,451,446 | 10/1948 | Parsons | 156/39 |
| 3,775,240 | 11/1973 | Harvey | 428/70 |
| 3,809,595 | 5/1974 | Nichols, Jr. | 156/267 |
| 3,922,413 | 11/1975 | Reineman | 428/119 |

FOREIGN PATENT DOCUMENTS

| | | | |
|---|---|---|---|
| 937149 | of 1973 | Canada | 428/310 HC |
| 1080754 | of 1967 | United Kingdom | |
| 1269338 | of 1972 | United Kingdom | 428/86 |

*Primary Examiner*—Paul J. Thibodeau
*Attorney, Agent, or Firm*—Kurt Kelman

[57] ABSTRACT

A multi-layer load-bearing board comprising at least three layers of different composition includes a core or basic layer comprised of a cementitious inorganic material, a cover layer of a fiber-reinforced resin subjectable to forces and an intermediate layer of a hydrophilic and water-dilutable or water miscible resin interconnecting the core or basic layer and cover layers in a force-transmitting manner.

21 Claims, 8 Drawing Figures

U.S. Patent  Sep. 29, 1981  4,292,364
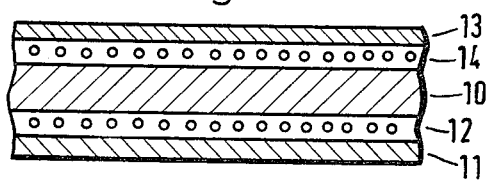
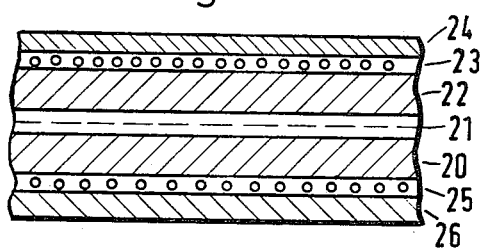
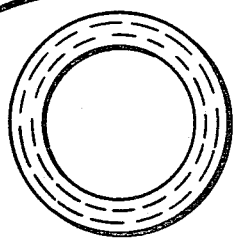
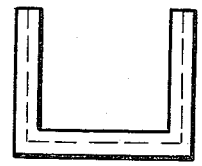
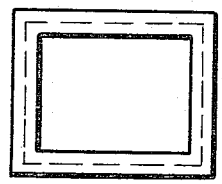

MULTI-LAYER BOARD

This is a continuation of our copending U.S. patent application Ser. No. 893,257, filed Apr. 5, 1978, now abandoned.

The present invention relates to a multi-layer load-bearing board and a process of preparing the same.

Multi-layer boards comprised of laminated layers are known. U.S. Pat. No. 2,806,811, for example, describes a paper-covered gypsum board wherein the paper layers are bonded to the gypsum board with a resin adhesive.

Laminated boards taking advantage of the good qualities of inorganic materials used for the core layer and organic plastics for the cover layer or layers are very useful. However, considerable difficulties have been encountered in providing a strong and lasting bond between layers of such different materials since not only the adhesion but also the mechanical properties of the materials cause problems. Glueing or bonding with adhesive does not provide strong enough connection between different layers.

Attempts to bond the two layers to each other while their materials were still wet and the layers were, therefore, in a plastic condition failed because when an organic plastics material was cast on a fresh core layer of concrete or a like water-containing cementitious binder material, which was not yet hardened, a water layer formed between the layers as the core layer hardened and prevented formation of a bond between the layers. Similar disadvantages are found when a material in a plastic condition was applied to a hardened layer.

It is the primary object of this invention to provide a multi-layer load-bearing board in which a cementitious material core or basic layer and at least one cover layer of organic plastics are combined while assuring strong adhesion therebetween so that there is no danger of the cover layer separating from the core or basic layer when the multi-layer board is in use, i.e. to connect the interfaces of the layers in a force-transmitting manner, the board constituting an integral structure as far as its mechanical characteristics are concerned.

The above and other objects of the present invention are accomplished with a multi-layer board comprising a core or basic layer comprised of a cementitious material, at least one cover layer subjectable to forces and consisting at least primarily of a fiber-reinforced thermoplastic or thermosetting resin, and an intermediate layer between the core or basic layer and each cover layer interconnecting their interfaces in a force-transmitting and tension-free manner, the intermediate layer consisting at least primarily of a hydrophilic resin capable of being diluted or mixed with water.

The cementitious material is illustrated by such materials as cement, including fast-hardening cement, lime, gypsum, magnesite and/or mixtures of magnesia and magnesium chloride, and may be fiber-reinforced. In a preferred embodiment, the core or basic layer is of mortar or concrete. The force-transmitting connection between the core or basic layer and each cover layer is provided by an intermediate layer connecting the interfaces of the core or basic layer and the cover layer and this connection between the layers may be enhanced by a mechanically interlocking structure of the interfaces and/or fibers projecting from one layer to the other.

In a preferred embodiment, the board comprises two cover layers, the core layer being disposed between two intermediate bonding layers interconnecting the core and respective ones of the cover layers The strong connection of the core or basic layer and each cover layer is provided by the intermediate layer in which the layers actually grow into each other or are mechanically locked to each other, which is meant by the layers being interconnected in a force-transmitting manner. By suitably adjusting the properties of the individual layers, a substantially stress-free and load-bearing product is obtained which constitutes a very advantageous laminated plate combining the advantages of inorganic materials with those of organic plastics.

The material of the intermediate layer and accordingly the intermediate layer itself differs in kind, properties and effect from the adjacent layers. The intermediate layer is a bonding layer.

The core or basic layer has a high rigidity or stiffness and there is no danger of aging since progressive hydration of the cementitious binder material will actually improve it. Subsequent shrinkage and cracks caused thereby are avoided and there is no decrease in rigidity because the evaporation of the water is impeded.

Such multi-layer structure has unique properties regarding strength and resistance to deformation. The cover layers capable of withstanding forces contribute to the bearing capacity of the board and enhance it. Heretofore, no sheet material of this type was known which was so well adapted for the production of round bodies and imparted to them the required rigidity. Being resistant to abrasion and wear, for instance by corrosion, the cover layers operate as protective layers and simultaneously provide a desired surface configuration. They also absorb maxima of tensile forces. Using the intermediate layer will remove difficulties arising from surface irregularities at the interfaces. The intermediate layer transmits shearing and other forces and prevents the spreading of cracks. It is a connecting layer constituting an advantageous transition between the core or basic layer and each cover layer.

In contrast to the cover layers in known multi-layer boards, the cover layers in the boards of the invention are reinforcing layers, for the core or basic layer. Since the board is a substantially integral structure with respect to its mechanical properties, it combines this mechanical advantage with the other advantages obtained by the use of inorganic and organic structural materials.

The multi-layer board of the present invention is far superior in its mechanical properties to known laminates of this type and will find particular application in the construction industry, in pipe systems, and in building tanks or like containers.

The binder material of the core layer may be cement, particularly a fast-hardening type of cement, or a magnesite type material, or a mixture of magnesia and magnesium chloride. Other cementitious binder materials useful for the board of the invention are burnt lime and gypsum, or liquid silicates which may be rapidly hardened by the admixture of suitable additives. If desired, the cementitious binder material may contain fillers or aggregates of natural or synthetic substances, such as sand, slag, bauxite or corundum and the like, as well as fibers of inorganic substances, including glass fibers, asbestos fibers and/or other mineral or metallic fibers, and/or fibers of organic substances.

The cover layer comprises strong plastics and operates not only as a protective layer but forms, in fact, an integral part of the core or basic layer in the multi-layer board, the cover layer reinforcing the core at its weak points, in addition to being resistant to abrasion, wear and corrosion, as well as being capable of imparting a desired surface configuration to the board. It consists, at least primarily of a fiber-reinforced plastic material or a resin capable of being diluted or mixed with water. The cover layer may contain inorganic fillers and/or carbon fibers. The fibers may be filaments, staple fibers, fibrous webs or rovings arranged in parallel. Similar reinforcing fiber may be arranged in the core in one or several superposed layers and/or in the intermediate bonding layer(s).

If desired, each cover layer may consist of several plies which differ from each other in their mechanical properties.

The favorable properties of the multi-layer board of the present invention are obtained by the use of intermediate layers between the core and each cover layer, the intermediate layer being comprised of hydrophilic (capable of being diluted or mixed with water) resins which may be cold hardening or thermosetting resins. The intermediate layer may have a thickness of about 0.1 to about 5 mm or more. It may be reinforced with inorganic fibers, fabrics or webs.

Such an intermediate layer transmits shearing and other forces, reduces such forces, and impedes tears and cracks. The intermediate layers also operate as bonding layers which provide a favorable interface between the core and cover layers. The reason for the strong bonding provided by the intermediate layer is the fact that it is a hydrophilic, water-dilutable or water-miscible resin connecting a cementitious material (inorganic) and a plastic or other resinous material, i.e. it has properties of both layers it interconnects, thus tending to integrate the core and cover layers with each other.

We have found that the multi-layer board may be prepared wet-on-wet, i.e. the core layer with a matrix of a cementitious binder material may not yet be hardened when it is laminated with a cover layer of plastics not yet polymerized. Using the intermediate layer of hydrophilic (capable of being diluted or mixed with water) resins the well known difficulties of binding organic and organic layers in their still workable condition has been overcome, so that it is now possible to deposit organic layers in workable condition on inorganic layers in workable condition, that is wet-on-wet and also wet-on-dry.

The accompanying drawing illustrates, by way of example, some embodiments of a multi-layer board according to the present invention.

BRIEF DESCRIPTION OF THE DRAWINGS

FIG. 1 is a cross sectional view of a portion of a flat board comprised of a core faced by two cover layers.

FIG. 2 is a like cross section showing a modification of the embodiment of FIG. 1.

FIG. 3 is a side view of a portion of a multi-layer board constructed according to any of the preceding embodiments but being arcuately curved and indented, rather than extending rectilinearly.

FIG. 4 is an end view of such a board shaped into a pipe.

FIGS. 5 to 8 are end views of variously shaped boards incorporating the structure of the embodiments of FIGS. 1 or 2.

The multi-layer board of FIG. 1 is comprised of core layer 10, cover layer 11 bonded to the core layer by intermediate layer 12, and another cover layer 13 bonded to the core layer by intermediate layer 14.

In the modification of this board shown in FIG. 2, the core layer has two plies 20 and 22 wherebetween there extends fibrous layer 21, cover layer 24 being bonded to the two-ply core by intermediate layer 23 and cover layer 26 being bonded to the core by intermediate layer 25.

In FIG. 5, the board has a U-shaped section, in FIG. 6 it has a truncated V-shape with longitudinal flanges, the board of FIG. 7 is corrugated, and FIG. 8 is a rectangular hollow cross section. Other shapes may obviously be fabricated.

The following specific examples further illustrate the practice of this invention, all parts being by weight unless otherwise indicated.

EXAMPLE 1

(Board according to FIG. 1)

A flat one-square meter multi-layer board according to FIG. 1 was produced in the following manner. Core 10 was glass fiber-reinforced concrete having a thickness of 20 mm and consisting of a very rapidly hardening modified Portland cement having a water cement value (ratio of water to cement) of 0.4 and containing 5%, by volume, of alkali, resistant glass staple fibers. Each cover layer 11 and 13 had the following composition:

One hundred grams of a styrene-containing vinyl ester resin (polymerized adduct of an epoxy resin and acrylic acid dissolved in styrene, with a styrene content of 45-50%) were dissolved with two grams of 50% methyl ethyl ketone peroxide in a plasticizer, 0.125 g of cobalt octoate (6% Co in styrene) and 1.2 g of dimethyl aniline (10% in styrene) being added as catalysts and activators. A glass fiber web weighing 450 g/m$^2$ was disposed in the vinyl ester resin and the fiber-reinforced layer was disposed and hardened on the core after the latter has been aged for 48 hours.

The core layer was aged in a mold for 48 hours and the two cover layers were applied to the aged, hardened core layer before they were hardened and were then hardened in contact with the core layer.

The cover layers were bonded to the core layer by interposed intermediate layers, each intermediate layer 12 and 14 having the following composition:

Hundred parts of "Beckopox" VEP 22 ("Beckopox" being liquid or solid epoxy resins of Farbwerke Hoechst, Germany, which may be used together with commercially available curing agents of special "Beckopox" curing agents and/or in conjunction with phenolic or amino resins at ambient or elevated temperatures), 80 parts of "Beckopox" special curing agent (also available from Farbwerke Hoechst, as a variety of modified polyamines and polyamide amines capable of imparting to the "Beckopox" epoxy resins different curing conditions and properties of the cured product), and 10 parts of alkali-resistant glass fibers having a length of 5 to 10 mm.

The surfaces of the cover layers facing the intermediate layer were roughened before the cover material was deposited. The components of the intermediate layer were mixed and the mixture was deposited as intermediate layer 12 onto the not yet cured but roughened cover layer 11. Then the preformed core 10 was pressed onto the intermediate layer 12. Then the following intermediate layer 14 was deposited between the core 10 and the cover layer 13.

Modifications of the compositions were made by replacing the rapidly hardening modified Portland cement by an ordinary cement to which an accelerator was added, the specific accelerating agent used being calcium chloride. The vinyl ester resin was replaced by an unsaturated polyester or any epoxy resin.

As special curing agents, "Beckopox" VEH 29 or VEH 14 were used, as well as the aliphatic polyamine "H 105 B" sold by Rutgerswerke Meiderich, Germany (pot life 20 to 40 hours at 25° C.) The "Beckopox" resins or curing agents were replaced by epoxy resins and curing agents therefor, produced by Ciba, of Basle, Switzerland, with substantially the same results. The Beckopox-resin may also be replaced by Epoxy-Bakelit comprising curing agents and stabilizers, e.g. Bakelit 2883, 2913; hardener ABS4 and stabilizers VVE.

The residual contents of water in the cementitious binders of the core layer had no perceptible influence on the bonding quality of the intermediate layers to the core. Under loading the mechanical quality of the multi-layer boards was excellent. Even higher qualities were obtained by adding to the cementitious material of the core or basic layer up to about 5 to 10 percent by weight of the resins used as admixture in the intermediate layers.

EXAMPLE 2

(Board according to FIG. 1)

The composition of the core layer was as follows: 100 parts of magnesia, 6 parts of a urea-formaldehyde condensation product, 142 parts of a 20% aqueous solution of magnesium chloride, 0.6 parts of glycerol or butyl glycol as a plasticizer. All components were thoroughly mixed and the mixture was placed into a mold for hardening.

The composition of the cover layer was as follows: 100 parts epoxy resin "Ciba X20", 90 parts of "Ciba HT 907" epoxy resin curing agent, 10 parts of "DY 040" (an accelerator sold by Ciba), 1 part of Ciba's DY 062 epoxy resin accelerator, 50 parts of hydrocarbon resin E ("Lithoplast") and 100 parts of a glass fiber web. The components were mixed, the mixture was molded into a plate and cured at a temperature 130° C. in 90 minutes. "Lithoplast" is dark brown resin with a softening point of about 100° C. and a melting temperature of about 120° C. to 140° C., having a molecular weight of 1000 to 2000. It is a hydrocarbon resin of aromatic character which contains hydrocarbons condensed in a ring, direct C-C bonds, secondary and tertiary C-atoms, and 2 to 3 double bonds per molecule. It is weakly polar.

The composition of the intermediate layer was as follows: 100 parts of Ciba's hydantoin resin, 100 parts of Ciba's curing agent for hydantoin resin, 20 parts of glass fibers and 1 part of a polyester fiber unwoven web ("KT 1751" of the firm Freudenberg, Weinheim, Germany).

The intermediate layer composition is poured in the liquid state over the shaped core and the formed cover layer was placed thereover, and the laminate was subjected to a temperature of 80° C. for two hours.

A water-dilutable or water-miscible epoxy resin, with a suitable curing agent therefor, as produced by RutgersWerke Meiderich, was used instead of the hydantoin resin with the same results.

EXAMPLE 3

(Board according to FIG. 1)

The core layer had the following composition: 100 parts of Portland cement ("PZ 550"), 20 parts of mineral aggregates having a maximum dimension of 2 mm, 50 parts of water, 0.06 parts of liquefier, 6 parts of zirconium glass fibers, 0.1 parts of 10% liquid soldium silicate.

The cover layer had the following composition: 100 parts of unsaturated, highly reactive polyester ("P 8" of BASF) of medium viscosity, having a double bond value of 0.20, 0.3 parts of a cobalt accelerator solution containing 1% Co, 2 parts of a catalyst paste (methyl ethyl ketone peroxide), and 100 parts of a roving fabric, the rovings consisting of short staple glass fibers.

The intermediate layer had the following composition: 100 parts of "Beckopox" VEP 22 epoxy resin, 50 parts of "Beckopox" VEH 14 curing agent, and 1 part of a polyester-cotton fabric, the denier of the polyester fibers being 5 to 10 mm.

The multi-layer board of FIG. 1 was produced wet-on-wet. The cover layer 11 was the lowest layer and the subsequent layer was superimposed thereon in the illustrated sequence.

Instead of the "P 8" polyester, we used mixtures of this resin with resin "E 200" of BASF, with the same result. Also useful for this purpose were the alkali-resistant product "A 410" of BASF as well as such resins as "W 41" or "W 45" of Bayer Leverkusen or similar resins of Hoechst.

By preparing the laminates in the wet-on-wet process, i.e. by superimposing the layers in the given sequence before the individual layers are hardened, the mechanical properties of the board are considerably improved. In this connection, it has proven particularly useful to place a polyester or polyethylene web or fabric in the intermediate layer, which contains wool or cotton fabrics, i.e. fibers which well absorb the resin and produce a defined intermediate layer. Very good results are obtained with three-dimensional fabrics.

The thicknesses of the layers may be freely chosen to suit the end use of the multi-layer load-bearing board, practical ranges encompassing 3 to 300 mm for the core or basic layer, 2 to 10 mm for the cover layer, and 0.5 to 2 mm for the intermediate layer.

In the process procedures several plies of the cover layer may be applied to providing superposed plies of plastics. Similarly the core itself may consist of a plurality of superposed plies. In the latter case, as shown in FIG. 2, a fibrous layer may be disposed centrally in the core layer, which will prevent propagation of cracks from ply to ply.

In providing multi-ply cover layers, the outer ply composition may be so selected as to make it resistant to chemical reactions and/or this ply may be mixed with sand to make the board useful in an abrasive environment. The surface layer of the outer cover layer in a multi-ply cover layer can be formed of a thermoplastic material, such as polyethylene, polypropylene, polyvinyl chloride, polyvinylidene fluoride, or other thermoplastics or also polyimides or also cellulose or casein or like materials. For a good adhesion between the surface coating and the adjacent resins, i.e. the resins of the cover layers (Example 2), it is preferred to press a thin fibrous reinforcement—in the main glass fiber—into the plastic material so that upon hardening a strong bonding is obtained. With polyvinyl chloride as a coating a known binder may be used for applying the thin glass fiber fabric.

With such surface film or layer of the above thermoplastics an excellent corrosion-resistant layer is obtained. At the same time, said thermoplastics—which may have a thickness of preferably 0,1 to about 10 mm—are useful in sealing shapes, as shown in FIGS. 3 to 8. As illustrated, the board may be shaped into any desired form, including tubes. They may be molded into the desired shapes at the time of manufacture and various methods may be used in preparing tubes or pipes, including a centrifugal method in which layer after layer is consecutively applied in a continuous process from nozzles supplying the compositions of the respective layers. The multi-layer tube is then hardened by means of warm air or infrared radiation at a maximum temperature of about 80° C.

The tube may also be produced by a winding process.

After the multi-layer board has been finished, it may be subjected to desired surface treatments, for instance a coating and/or polishing.

What is claimed is:

1. A multi-layer load-bearing board comprising at least three layers of different composition, including
    (a) basic layer comprised of a cementitious inorganic material,
    (b) a cover layer subjectable to mechanical forces and consisting of a fiber-reinforced organic plastic and
    (c) an intermediate layer of a hydrophilic resin dilutable or miscible with water interconnecting the basic layer and cover layer in a force-transmitting manner.

2. The multi-layer load-bearing board of claim 1, wherein the cementitious inorganic material of the basic layer comprises a binder selected from the group consisting of cement, lime, gypsum, magnesite and a mixture of magnesia and magnesium chloride.

3. The multi-layer load-bearing board of claim 2, wherein the cementitious inorganic material of the basic layer contains aggregates.

4. The multi-layer load-bearing board of claim 1, wherein the basic layer is comprised of mortar or concrete.

5. The multi-layer load-bearing board of claim 1, wherein the cementitious inorganic material contains admixtures.

6. The multi-layer load-bearing board of claim 1 or 5, wherein the cementitious inorganic material is fiber-reinforced.

7. The multi-layer load-bearing board of claim 6, wherein the reinforcing fiber is selected from filaments, staple fibers, fibrous mats and rovings.

8. The multi-layer load-bearing board of claim 1, wherein the intermediate layer is fiber-reinforced.

9. The multi-layer load-bearing board of claim 8, wherein the reinforcing fiber is selected from filaments, staple fibers, fibrous mats and rovings.

10. The multi-layer load-bearing board of claim 1 or 8, wherein the intermediate layer contains fillers.

11. The multi-layer load-bearing board of claim 1 or 8, wherein the intermediate layer contains minor amounts of water.

12. The multi-layer load-bearing board of claim 21, wherein the synthetic resin of the cover layer is a thermosetting resin.

13. The multi-layer load-bearing board of claim 21, wherein the synthetic resin of the cover layer is a thermoplastic resin.

14. The multi-layer load-bearing board of claim 12 or 13, wherein the cover layer contains fillers.

15. The multi-layer load-bearing board of claim 1, wherein the reinforcing fiber of the cover layer is selected from filaments, staple fibers, fibrous mats and rovings.

16. The multi-layer load-bearing board of claim 1, comprising two of said cover layers and two of said intermediate layers interconnecting the basic and respective ones of the cover layers in a force-transmitting manner, the basic layer being interposed between the intermediate layers.

17. The multi-layer load-bearing board of claim 1 or 16, further comprising a coating over at least one of the cover layers.

18. The multi-layer board of claim 17, wherein a reinforcing material is embedded in the coating.

19. The multi-layer load-bearing board of claim 2, wherein the cementitious inorganic material of the basic layer contains fillers.

20. The multi-layer load-bearing board of claim 1 or 8, wherein the intermediate layer contains minor amounts of cement.

21. The multi-layer load-bearing board of claim 1, wherein the fiber-reinforced plastic of the cover layer comprises a synthetic resin.

* * * * *